Figure 1:
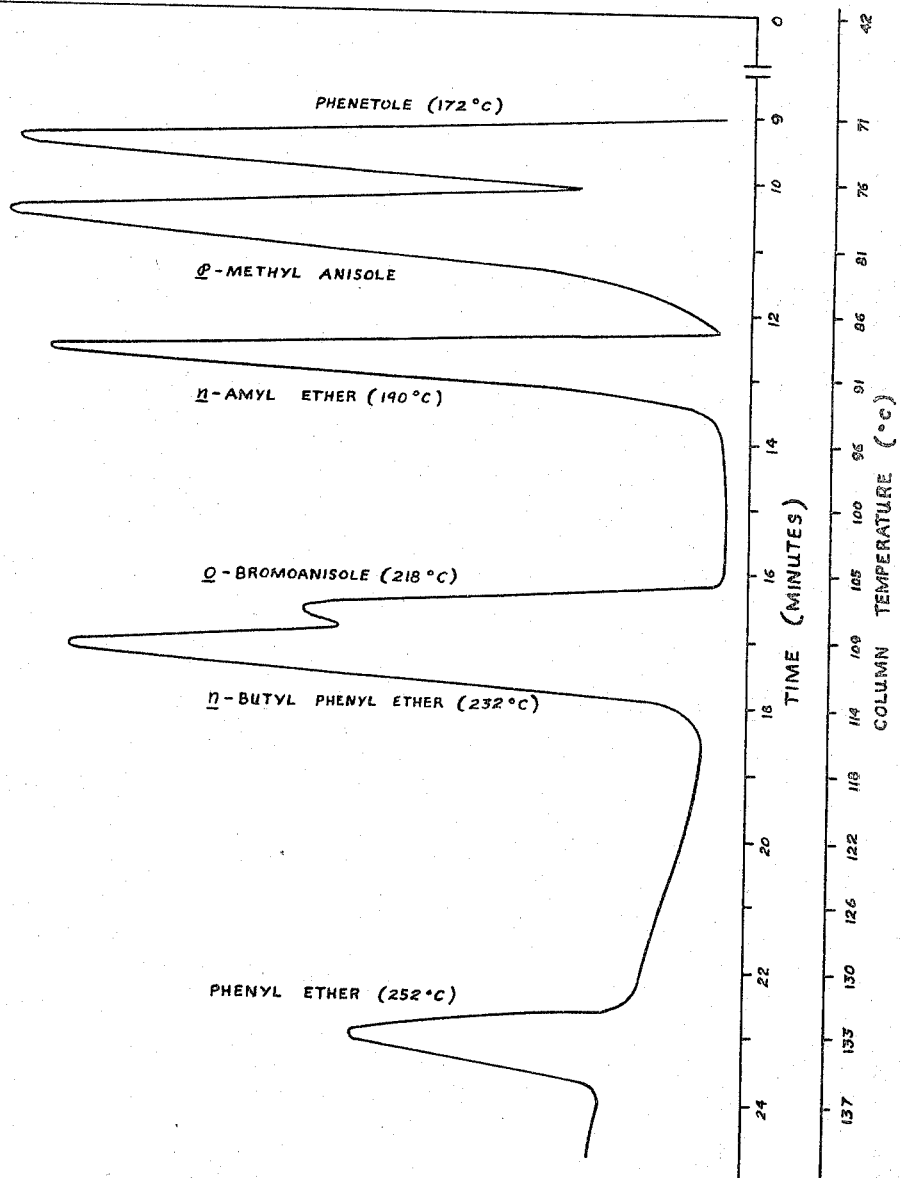

April 4, 1967 L. B. ROGERS ETAL 3,312,042
GAS-SOLID CHROMATOGRAPHIC COLUMN
Filed March 4, 1964 4 Sheets-Sheet 1

FIG. I

INVENTORS
Lockhart B. Rogers
BY Alan G. Altenau
Townsend and Townsend
attorneys

INVENTORS
Lockhart B. Rogers
Alan G. Altenau
BY
Townsend and Townsend
attorneys

United States Patent Office 3,312,042
Patented Apr. 4, 1967

3,312,042
GAS-SOLID CHROMATOGRAPHIC COLUMN
Lockhart B. Rogers, West Lafayette, Ind., and Alan G. Altenau, Cincinnati, Ohio, assignors, by mesne assignments, to Varian Aerograph, a corporation of California
Filed Mar. 4, 1964, Ser. No. 349,367
14 Claims. (Cl. 55—67)

This invention relates to gas-solid chromatography. More particularly, it relates to novel materials for use as solid phase adsorbents in chromatographic columns.

Attempts are constantly being made to push the limit of gas chromatography to higher and higher temperatures. The chief reason for doing so is that it permits analysis of samples containing higher boiling compounds which generally have higher molecular weights. Up to the present time research has been directed almost entirely in the direction of using less volatile liquid phases on an inert substrate. Unfortunately, when the higher temperatures are employed, small but measurable amounts of the partitioning liquids are volatilized thereby interfering with the measured results. This phenomenon is generally referred to as "bleed." Aside from the bleed problem, liquids used for partitioning are generally not of universal application for all types of compounds.

The use of solid adsorbents has not to date received serious consideration for practical use. The reasons for this may be summarized by the feelings that solid adsorbents are characterized by (a) irreversible adsorption, (b) variable activity of adsorbents, (c) catalytic effects on adsorbent surfaces, and (d) excessive retention of polar molecules.

The present invention bypasses the problems inherent in the gas-liquid techniques by utilizing solid adsorbents. The particular materials here employed are characterized by the fact that they avoid the heretofore undesirable attributes of solid materials. As will be illustrated hereinafter, they are successfully used for the separation of a plurality of organic compounds without encountering any serious problems of the type noted above. At the same time, and consistent with the concept of using solid adsorbents, the bleed problem encountered with the use of liquid partitioning agents is virtually nonexistent. Thus, the present chromatographic columns are utilizable at relatively extremely high temperatures as required depending upon the materials being processed. In addition, and as will also be illustrated, the present columns have been found to be remarkably versatile in the separation of a diverse number of organic materials.

The foregoing is accomplished by the present invention with a gas-solid chromatographic column comprising a heat conductive tube packed with devolatilized crystals formed from a coordination compound of a salt of a transition metal, coordinated by a group selected from water and nitrogen compounds wherein the nitrogen atom has an unshared electron pair.

The term "devolatilized crystals" as used throughout this specification is meant to include those transition metal salts commonly referred to as "clathrate crystals," i.e., those salts whose crystal structure comprises a lattice framework defining and enclosing a central volume, which before devolatilization is occupied by a foreign molecule or atom such as a water molecule, which can easily be removed by heating the crystal. When the crystal structure is "devolatilized," the lattice remains intact, and encloses the empty space which was formerly occupied by the foreign molecule or atom. Thus, the compositions of this invention are always crystalline, i.e., the crystal lattice remains intact after the heating step. For a more thorough treatment of this subject see Encyclopedia Britannica, 1957 ed., vol. 6, p. 820.

In this specification and claims "coordination compound" is used in the usual sense and designates a molecular or addition compound formed by combinations of apparently saturated materials which are capable of independent existence. The various coordination compounds within the scope of this invention may vary from member to member in certain properties to some extent, but all have the common property of being peculiarly adapted for chromatographic separations.

As mentioned, the materials herein utilized are devolatilized coordination compounds. As will be made more clear hereinafter, the term "devolatilized" is used to define that state of the coordination compound following a treatment of it to remove volatile components from the crystal structure. Preferably, this devolatilization is accomplished by heating the coordination compound crystals to a suitable temperature following its preparation.

The present materials are prepared from a salt of a transition metal. The transition metals, as defined in the Encyclopedia Britannica, 1957 ed., vol. 17, p. 521 are divided into three groups: (1) elements of atomic number 22–31, inclusive; (2) elements of atomic number 40–49, inclusive; and (3) elements of atomic number 72–81, inclusive. In general, the metals which form the majority of the best characterized complexes may be summarized as including the transition metals vanadium, chromium, molybdenum, tungsten, manganese, iron, ruthenium, osmium, cobalt, iridium, nickel, palladium platinum, copper, silver, gold, zinc, cadmium and mercury. As will be seen by the examples hereinafter, exceptionally fine results have been obtained with copper in the cupric form.

The metal is employed as a salt with any suitable anion being used in combination with the metal. Suitable anions would thus include univalent or divalent anions such as the chloride ion, sulfate ion, nitrate ion, cyanide ion, thiocyanide ion, bromide ion, and the like. The nitrate ion has been demonstrated to yield exceptionally good results, especially in combination with copper.

The metal salt is coordinated with a suitable coordinating group which in the present case is preferably water so as to form hydrates or a nitrogen compound wherein the nitrogen atom has an unshared electron pair for coordination with the metal. Examples of such nitrogen compounds are pyridine, ammonia, 2,2'-bipyridine, 2,2-biquinoline, ethylene diamine, the material known as "dien" having the empirical formula $C_4H_{13}N_3$, and preferably the group of materials known as the 1,10-phenanthrolines including the substituted phenanthrolines as well as 1,10-phenanthroline itself. In some cases it may be possible to substitute other types of coordinating groups containing other atoms instead of nitrogen such as oxygen, arsenic, phosphorous, sulfur, and the like which have the requisite unshared electron pair for coordination purposes to derive equivalent and substitute materials for those hereinafter specifically described.

The solid adsorbents of the present invention may be prepared generally as follows. The metal salt is dissolved in a solvent such as water, the solution of the coordinating compound is added thereto, and the solution heated if necessary to dissolve the complexing or coordinating group. The solution is evaporated and/or cooled and the coordination compound will crystallize out so that it can be filtered and collected on a filter paper. The crystals are then ready for the devolatilization precedure mentioned above. Briefly, this is preferably accomplished by heating the crystals to the requisite temperature to drive off volatile components. A few examples will indicate what is contemplated at this stage.

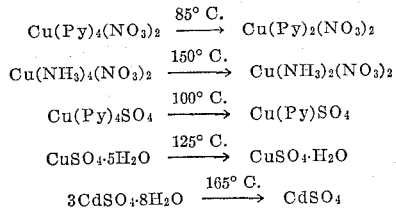

(Py=pyridine).

The materials on the right-hand side of the equations are herein referred to as devolatilized crystals. They are all, including $CdSO_4$, referred to as coordination compounds to make clear their derivation and to implicate the "holes" in the crystals that are left by the removal of the volatile elements. The temperatures indicated above the arrows have been found to achieve the noted reaction where heating has been carried for several hours, such as three or four hours. Other suitable temperatures could be used that achieve the desired result without decomposing the material beyond the intended stage.

It has also been found that certain coordination compounds within the scope of the present invention do not liberate any significant proportion of volatile components as in the examples above. For example, one of the preferred materials within the present invention is the cupric bis(1,10-phenanthroline) nitrate complex. When this material was heated no substantial change was noted although it is believed that perhaps some water is driven off at about 125° C.

Where the materials are of the first type and a substantial portion of the complex is volatilized (this may be viewed as a partial thermal decomposition), the resulting crystalline product may have a lattice containing "holes" formerly occupied by the volatile components. Crystals of this type are preferably handled quite carefully so as to not collapse the crystal structure and create a powder. The reason for avoiding powdering of the crystals is than when powdered forms are packed in tubes and used as a chromatographic column, pressure drop becomes excessive.

With those materials that do not give up a substantial part of their microscopic structure during the devolatilization step the crystals can be more roughly handled without danger of powdering the mass.

The crystals formed as noted are then placed in a suitable heat conductive tube so that when the materials being separated are passed through the column heat may be applied from without the tube to raise the mass to the desired temperature. Often, the tube is made from copper and, in general, will have a relatively narrow diameter on the order of a fraction of an inch, 1/8" O.D. being representative. Other suitable gas conductive materials include glass, nylon, Teflon, and the like.

In order to pack the tube with crystals of the sensitive type, a gentle tapping of the tube with a wooden handle, for example, has been found to accomplish the desired result. Where such treatment is too severe for a substance and powdering results, the adsorbent may be prepared within the tube itself. Where the non-sensitive adsorbents are employed, such as the cupric bis(1,10-phenanthroline) nitrate, it may be possible to use an ordinary vibrator in order to pack the tube with the adsorbent.

Particle size of the crystals affects column efficiency and the results of separations. Thus, sizing of the materials to a desired point will generally be accomplished before packing the column. The size chosen will depend upon the particular material and the end use contemplated. As a guide, it has been found that for microgram samples, a mesh size of about 50-60 U.S. Standard sieve of copper (II) dipyridine nitrate worked very well in the separation of numerous aliphatic and aromatic hydrocarbons.

Column efficiency is also dependent upon flow rate of the carrier gas, the carrier gas selected, and the sample size. Again these are chosen to best suit the conditions of the separation. In general it has been found both retention time and column efficiency decrease with increasing sample size with usable results having been obtained with samples of from 0.05 to 5.0 micrograms. With these samples, an optimum flow rate for the carrier gas has been observed to be about 5 cm. per second with several of the present column materials at 38° C.

In order to demonstrate the efficacy of the present materials as a chromatographic tool, a number of separations were run with varying columns and substances to be separated. Copper tubing packed with adsorbent prepared as described above was utilized in all cases. The tubing was made part of a gas chromatograph equipped with a flame ionization detector of conventional type (an Aerograph Hy-FI 600 unit made by Wilkens Instrument and Research, Inc., was employed for these tests) and high purity nitrogen was used as the carrier gas. Sample injection was accomplished with the plunger of a 50 microliter syringe containing the sample. The sample was pumped with air two or more times until a 1 microliter portion of the air in the syringe contained only enough sample to give a peak height of approximately half the width of the chart paper of a Leeds and Northrup Speedomax H strip-chart recorder having a full-scale response of 1 millivolt.

All of the retention data reported below are for a column temperature of 38° C. unless otherwise specified. Upon increasing the column temperature above 38° C. the expected decreased in retention time was observed. Some of the compounds that did not come off the adsorbent in less than one hour at 38° C. sometimes appeared at higher temperatures.

"Blank" runs were also made for comparison using columns packed with the material from which the volatile substances had not yet been removed. As seen in the reported data, little or no separation was obtained with these materials which had not been devolatilized to produce the present adsorbents.

TABLE 1

Column packing=$CuSO_4.5H_2O$
Column length=6 ft.
Column temperature=38° C.
Flow rate of carrier gas=26.4 cc./min.

| Compound | Retention Time (sec.) | Description of Peak* |
|---|---|---|
| Methane | 9 | sy. |
| Ethane | 9 | sy. |
| Propane | 9 | sy. |
| n-Butane | 9 | sy. |
| n-Pentane | 9 | sy. |
| n-Hexane | 10 | sy. |
| n-Heptane | 14 | sy. |
| n-Octane | 25 | sy. |
| Benzene | 13 | sy. |
| Toluene | 23 | sy. |
| Chlorobenzene | 31 | sy. |
| Ethylbenzene | 47 | v.; sl.; t. |
| n-Propyl benzene | 125 | t. |
| Bromobenzene | 57 | sy. |
| Isopropyl benzene | 96 | t. |
| p-Xylene | 73 | t. |
| o-Dichlorobenzene | 140 | sy. |
| Ethyl ether | 68 | sy. |
| Diisopropyl ether | 180 | t. |
| Acetone | 540 | t. |
| Methanol | Did not appear | |
| Ethyl acetate | Did not appear | |

*sy.=symmetrical. v.=very. sl.=slight. t.=tailing.

TABLE 2

| Compound | Retention Time (sec.)[a] | Retention Time (sec.)[b] | Description of Peak[c] |
|---|---|---|---|
| Methane | 11 | 11 | sy. |
| Ethane | 11 | 11 | sy. |
| Propane | 11.5 | 11 | sy. |
| n-Butane | 14.7 | 13.5 | sy. |
| n-Pentane | 22 | 19 | sy. |
| n-Hexane | 40 | 34 | sy. |
| n-Heptane | 103 | ------ | sy. |
| n-Octane | 306 | 215 | sy. |
| Isooctane | 116 | 90 | sy. |
| Cyclohexane | 33 | ------ | sy. |
| Methyl iodide | 58 | ------ | sy. |
| Dichloromethane | 51 | ------ | sy. |
| Benzene | 310 | 120 | sy. |
| Toluene | ------ | 425 | sy. |
| Chlorobenzene | ------ | 435 | sy. |
| Ethylbenzene | ------ | 1,053 | b.; sy. |
| p-Xylene | ------ | 1,575 | v.; b.; sy. |

[a] Column packing=$CuSO_4 \cdot H_2O$.
    Column length=5 ft.
    Column temperature=38° C.
    Flow Rate of carrier gas=26.0 cc./min.
[b] Column packing=$CdSO_4$.
    Column length=6 ft.
    Column temperature=38° C.
    Flow Rate of carrier gas=25.0 cc./min.
[c] sy.=symmetrical. b.=broad. v.=very.

TABLE 3

Column packing=$CuSO_4 \cdot H_2O$.
Column length=5 ft.
Flow rate of carrier gas=26.0 cc./min.

| Compound | Retention Time (sec.)[a] | Retention Time (sec.)[b] | Description of Peak[c] |
|---|---|---|---|
| Benzene | 99 | 103 | v.; sl.; t. |
| Toluene | 334 | [d] 210 | v.; s.; t. |
| Chlorobenzene | 243 | 103 | sy. |
| Bromobenzene | 485 | 180 | v.; s.; t. |
| Ethylbenzene | 780 | [d] 305 | sy. |
| Iodobenzene | 1,265 | 515 | v.; sl.; t. |
| o-Dichlorobenzene | 712 | 175 | sy. |

[a] Column temperature=93° C.
[b] Column temperature=135° C.
[c] v.=very. sl.=slight. s.=severe. sy.=symmetrical. t.=tailing.
[d] Approximately.

TABLE 4

Column packing=$Cu(NH_3)_2(NO_3)_2$
Column length=7 ft.
Flow rate of carrier gas=26.0 cc./min.

| Compound | Retention Time (sec.)[a] | Description of Peak[a,c] | Retention Time (sec.)[b] | Description of Peak[b,c] |
|---|---|---|---|---|
| Methane | 13.5 | sy | ------ | ------ |
| Ethane | 13.5 | sy | ------ | ------ |
| Propane | 13.5 | sy | ------ | ------ |
| n-Butane | 15.0 | sy | ------ | ------ |
| n-Pentane | 22 | sy | ------ | ------ |
| n-Hexane | 37 | sy | ------ | ------ |
| Isooctane | 105 | sy | ------ | ------ |
| n-Octane | 300 | sy | ------ | ------ |
| Benzene | 115 | sy | 38 | sy. |
| Toluene | 435 | sy | 86 | sy. |
| Chlorobenzene | 570 | sy | 120 | sy. |
| Ethylbenzene | 1,020 | b; sy | 170 | sy. |
| p-Xylene | 1,410 | b; sy | 210 | sy. |
| m-Xylene | 1,460 | b; sy | ------ | ------ |
| o-Xylene | 1,770 | b; sy | 240 | sy. |
| Bromobenzene | ------ | ------ | 210 | sy. |
| n-Propyl benzene | ------ | ------ | 340 | sy. |
| Isopropylbenzene | ------ | ------ | 267 | sy. |
| o-Dichlorobenzene | ------ | ------ | 375 | sy. |
| Iodobenzene | ------ | ------ | 440 | sy. |
| Ethyl ether | 375 | sy | 57 | sy. |
| Diisopropyl ether | ------ | ------ | 99 | sy. |
| N-Propyl ether | ------ | ------ | 177 | sy. |
| Tetrahydrofuran | ------ | ------ | 300 | sy. |
| p-Dioxane | ------ | ------ | 382 | sy. |
| Allyl ether | ------ | ------ | 360 | sy. |
| n-Butyl ether | ------ | ------ | [d] 480 | v.b.; sy. |
| Ethyl acetate | Did not appear | | 735 | sy. |
| Dimethyl carbonate | ------ | ------ | 705 | sy. |
| Acetone | Did not appear | | 450 | sy. |
| Methyl ethyl ketone | ------ | ------ | 780 | sy. |
| 3-pentanone | ------ | ------ | [d] 1,290 | v.b.; sy. |
| Methanol | Did not appear | | 143 | sy. |
| Ethanol | ------ | ------ | 350 | sy. |
| Isopropanol | ------ | ------ | 555 | sy. |
| Allyl alcohol | ------ | ------ | 570 | v.b.; sy. |
| Dichloromethane | 36 | sy | ------ | ------ |
| Methyl iodide | 27 | sy | ------ | ------ |
| Cyclohexane | 30 | sy | ------ | ------ |
| Pentene-1 | 30 | sy | ------ | ------ |
| Cyclohexene | 50 | sy | ------ | ------ |

[a] Column temperature=38° C.
[b] Column temperature=81° C.
[c] sy.=symmetrical. v.=very. b.=broad.
[d] Approximate.

TABLE 5

Column packing=Cu(Py)₂(NO₃)₂ (Py=pyridine)
Column length=5½ ft.
Column temperature=38° C.
Flow rate of carrier gas=27.2 cc./min.

| Compound | Retention Time (sec.) | Description of Peak [a] |
|---|---|---|
| Alkylated and Halogenated Benzenes: | | |
| Benzene | 35 | sy. |
| Toluene | 80 | sy. |
| Chlorobenzene | 137 | sy. |
| Ethylbenzene | 195 | sy. |
| p-Xylene | 210 | sy. |
| m-Xylene | 232 | sy. |
| o-Xylene | 230 | sy. |
| Cumene | 395 | sy. |
| Bromobenzene | 265 | sy. |
| n-Propyl benzene | 515 | sy. |
| Mesitylene | 755 | sy. |
| p-Cymene | 1,200 | sy. |
| o-Dichlorobenzene | 755 | sy. |
| Benzyl chloride | 1,182 | sy. |
| o-Bromotoluene | 612 | sy. |
| p-Bromotoluene | 783 | sy. |
| Ketones: | | |
| Acetone | 38 | sy. |
| 2-pentanone | 210 | sy. |
| 3-pentanone | 159 | sy. |
| Methyl isobutyl ketone | 457 | sy. |
| Mesityl oxide | 700 | sy. |
| Methyl ethyl ketone | 77 | sy. |
| 2-heptanone | 1,750 | sy. |
| 3-heptanone | 1,260 | sy. |
| Cyclopentanone | 425 | sy. |
| Cyclohexanone | 1,155 | sy. |
| Ethers: | | |
| Ethyl ether | 20 | sy. |
| Diisopropyl ether | 38 | sy. |
| Tetrahydrofuran | 50 | sy. |
| Ethylene glycol dimethyl ether | 105 | sy. |
| Allyl ether | 123 | sy. |
| p-Dioxane | 78 | sy. |
| n-Propyl ether | 60 | sy. |
| n-Butyl ether | 376 | sy. |
| Esters: | | |
| Ethyl acetate | 66 | sy. |
| Ethyl propionate | 145 | sy. |
| Ethyl butyrate | 400 | sy. |
| Dimethyl carbonate | 52 | sy. |
| Isoamyl acetate | 1,165 | sy. |
| Isopropenyl acetate | 127 | sy. |
| n-Butyl acetate | 520 | sy. |
| Alcohols: | | |
| Methanol | 50 | sy. |
| Ethanol | 46 | sy. |
| Isopropanol | 61 | sy. |
| Isobutanol | 202 | sy. |
| n-Butanol | 291 | sy. |
| t-amyl alcohol | 165 | sy. |
| 2-pentanol | 382 | sy. |
| 2-methyl-2-pentanol | 590 | sy. |
| Allyl alcohol | 93 | sy. |
| n-Amyl alcohol | 880 | sy. |
| 2-hexanol | 1,105 | sy. |
| Ethylene chlorohydrin | 178 | v.; sl.; t. |

[a] sy.=symmetrical. v.=very. sl.=slight. t.=tailing.

From the above results reported in Tables 1 through 5, it will be seen that some of the more striking details of the behavior of the present adsorbents are as follows:

At 38° C. Cu(Py)₂(NO₃)₂ did an excellent job of separating alcohols, esters, ethers, and ketones up to boiling points of approximately 160° C., alkylated and halogenated benzenes up to boiling points of about 185° C., and aliphatic hydrocarbons starting from n-butane up to those having boiling points of about 210° C. These limits were further extended upon increasing the column temperature. All the peaks for the above classes or organic compounds were completely symmetrical. Examples of the "complete" separations obtained with this column are: 3- and 2-heptanones with retention times of 1260 and 1750 seconds, respectively; ethyl and isopropyl alcohols, with retention times of 46 and 61 seconds, respectively; and ethyl butyrate and n-butyl acetate, with retention times of 400 and 520 seconds, respectively.

Using a column of Cu(NH₃)₂(NO₃)₂, successful separations were made for aliphatic hydrocarbons starting from propane on and for alkylated and halogenated benzenes. Tailing was not found for any of the above types of compounds, but very broad symmetrical peaks and relatively long retention times were observed for high-boiling aromatic compounds such as the xylenes. Ethyl ether was the only oxygenated compound observed to come off this column at 38° C.

A column of Cu(Py)SO₄ at a temperature of 38° C. exhibited partial separation of methane from ethane, a separation not previously encountered in our series of adsorbents. Although alcohols did not come off this column, several ethers, acetone, methyl ethyl ketone, and ethyl acetate did come off. At a column temperature near 100° C., separations of a relatively large number of ethers, esters, and ketones were possible.

Columns of CuSO₄·H₂O and CdSO₄ separated adjacent aliphatic hydrocarbons starting with propane. Benzene, with a retention time of 310 seconds, was the only aromatic hydrocarbon to come off the CuSO₄·H₂O column while no oxygenated compounds came off this column at 38° C. A column of CdSO₄ permitted benzene through the xylenes to appear with benzene having a retention time of 120 seconds.

Figure 2:
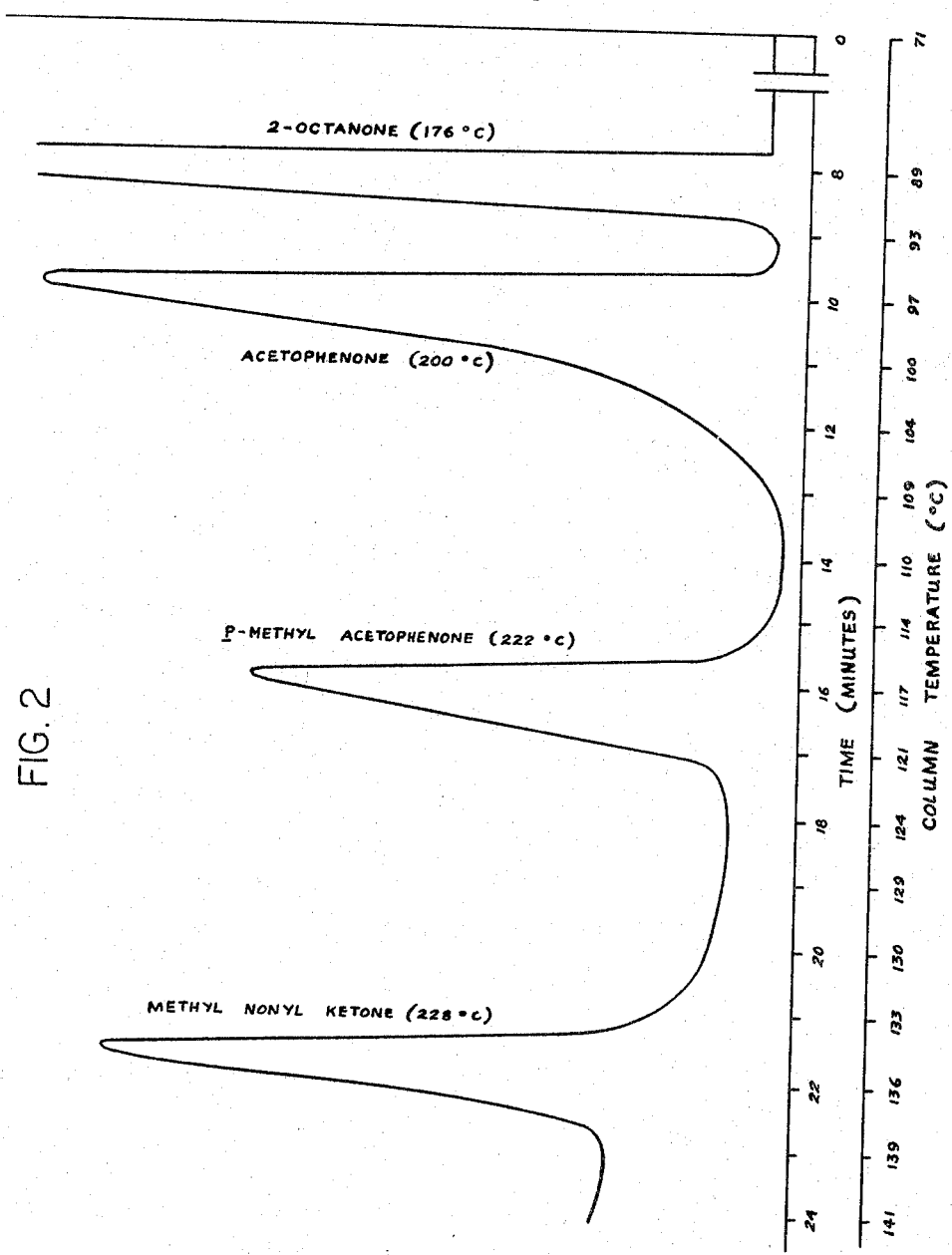
Figure 3:
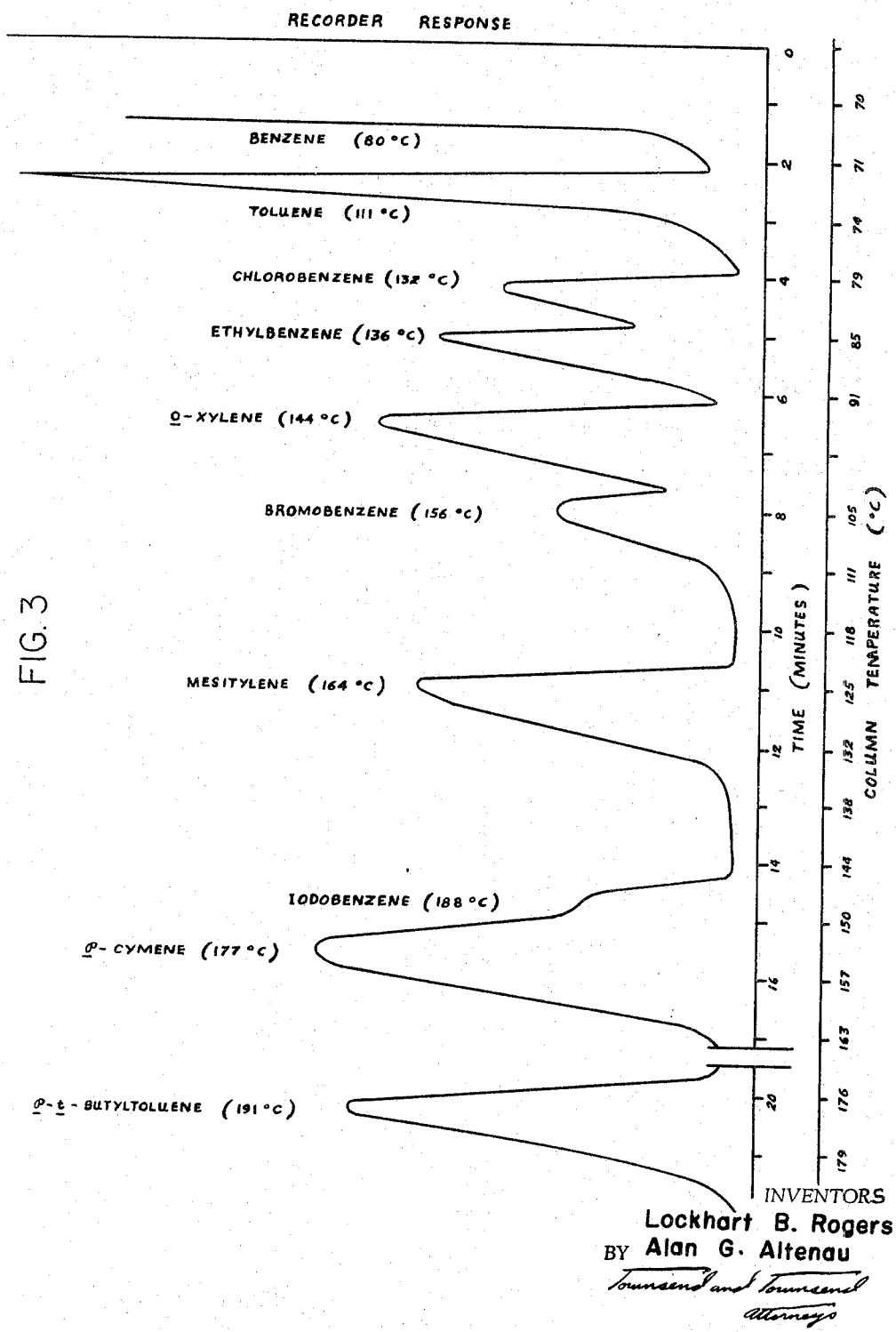
Figure 4:
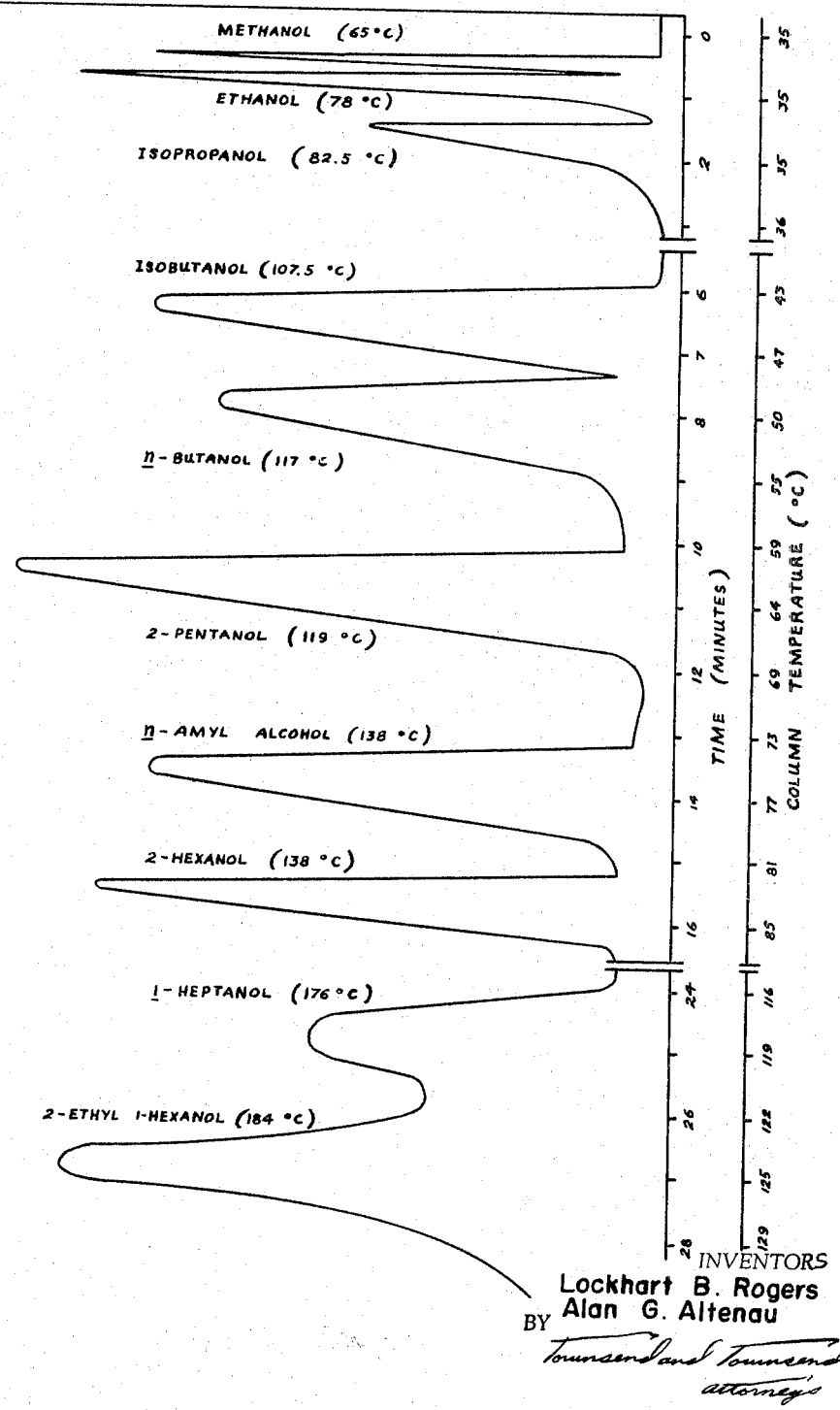

A preferred material, owing to its exceptional performance at high temperatures and with a variety of different materials establishing its relatively universal utility, is the complex copper di(1,10-phenanthroline)-(NO₃)₂. This material was prepared in accordance with the previously described procedure, devolatilized by heating, and the crystals packed in a copper tubing to form a column with a length of 2′9″. Results with various mixtures of organic compounds are shown in FIGS. 1 through 4 of the drawings. FIG. 1 represents a trace obtained with a mixture of certain aliphatic and aromatic ethers. FIG. 2 shows a trace obtained from a mixture of "high-boiling" ketones. FIG. 3 shows the result of a separation of aromatic hydrocarbons, and FIG. 4 shows the results obtained with alcohols.

It should be obvious to those skilled in the art that a particular column should be selected with the type of separation in mind since as shown by all of the above experimental results, some of the materials perform better than others under certain conditions. However, as it is common to all of the columns of the present invention that a highly desirable separation is achieved with a variety of materials and this is so even where high temperatures are required. In all cases an avoidance of column bleed is experienced as evidenced by flat baselines in the recorded traces obtained from blank runs.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A gas-solid chromatographic column comprising a suitable tube packed with devolatilized clathrate crystals formed from a coordination compound of a salt of a transition metal selected from the group consisting of Groups I–B and II–B of the Periodic Table of Elements and an aromatic bidentate nitrogen containing coordinating group.

2. A chromatographic column in accordance with claim 1 wherein said bidentate coordinating group is a 1,10-phenanthroline.

3. In a gas-solid chromatograph, the combination of a column comprising a copper tube packed with devolatilized clathrate crystals of the coordination compound cupric dipyridine nitrate.

4. In a gas-solid chromatograph, the combination of a column comprising a copper tube packed with devolatilized clathrate crystals of the coordination compound cupric diammonium nitrate.

5. In a gas-solid chromatograph, the combination of a column comprising a copper tube packed with devolatilized clathrate crystals of the coordination compound cupric pyridine sulfate.

6. In a gas-solid chromatograph, the combination of a column comprising a copper tube packed with devolatilized clathrate crystals of the coordination compound cupric sulfate monohydrate.

7. In a gas-solid chromatograph, the combination of a column comprising a copper tube packed with devolatilized clathrate crystals of the coordination compound cadmium sulfate.

8. In a gas-solid chromatograph, the combination of a column comprising a copper tube packed with devolatilized clathrate crystals of the coordination compound cupric bis-1,10-phenanthroline nitrate.

9. A method for separating a mixture of chemical compounds comprising flowing the mixture in vapor phase at a preselected elevated temperature below about 80° C. through a chromatographic column with a nitrogen carrier gas, said column being packed with devolatilized clathrate crystals of the coordination compound cupric dipyridine nitrate.

10. A method for separating a mixture of chemical compounds comprising flowing the mixture in vapor phase at a preselected elevated temperature through a chromatographic column with a nitrogen carrier gas, said column being packed with devolatilized clathrate crystals of the coordination compound cupric bis(1,10-phenanthroline) nitrate.

11. In a gas-solid chromatographic column including a suitable tube packed with a solid adsorbent phase, the improvement comprising employing as the solid phase adsorbent, devolatilized clathrate crystals formed from a coordination compound of a salt of a transition metal selected from the group consisting of Groups I–B and II–B of the Periodic Table of Elements and a coordinating group selected from the class consisting of water and nitrogen compounds wherein the nitrogen atom has an unshared electron pair.

12. A gas-solid chromatographic column in accordance with claim 11 wherein said suitable tube is a copper tube 13. A gas-solid chromatographic column in accordance with claim 11 wherein said salt of a transition metal is a cupric salt.

14. A method for separating a mixture of chemical compounds in a chromatographic column packed with a solid adsorbent comprising flowing the mixture in vapor phase at a preselected elevated temperature less than the melting temperature of said solid adsorbent, with a carrier gas, through said chromatographic column, said column being packed with devolatilized clathrate crystals formed from a coordination compound of a salt of a transition metal selected from the group consisting of Groups I–B and II–B of the Periodic Table of Elements and a coordinating group selected from the class consisting of water and nitrogen compounds wherein the nitrogen atom has an unshared electron pair.

References Cited by the Examiner

UNITED STATES PATENTS

| 2,723,756 | 11/1955 | Miller et al. | 55—67 |
| 3,038,904 | 6/1962 | Godfrey | 260—438 |
| 3,048,029 | 8/1962 | Juvet et al. | 55—67 |

OTHER REFERENCES

Sidgwick: The Chemical Elements and Their Compounds, Oxford Press, London, 1950, p. 114.

Morrison et al.: Organic Chemistry, Allyn and Bacon, Inc., Boston, 1960, p. 850.

Analytical Chemistry, vol. 32, pp. 1386 and 1387 (1960).

REUBEN FRIEDMAN, *Primary Examiner.*

C. HART, *Assistant Examiner.*